United States Patent
Zomet et al.

(10) Patent No.: US 10,453,098 B2
(45) Date of Patent: Oct. 22, 2019

(54) PRIVACY-AWARE PERSONALIZED CONTENT FOR THE SMART HOME

(71) Applicant: Google LLC, Mountain View, CA (US)

(72) Inventors: Asaf Zomet, Jerusalem (IL); Shlomo Reuben Urbach, Rehovot (IL)

(73) Assignee: Google LLC, Mountain View, CA (US)

( * ) Notice: Subject to any disclaimer, the term of this patent is extended or adjusted under 35 U.S.C. 154(b) by 802 days.

(21) Appl. No.: 14/638,937

(22) Filed: Mar. 4, 2015

(65) Prior Publication Data

US 2016/0260135 A1    Sep. 8, 2016

(51) Int. Cl.
*G06Q 30/02*    (2012.01)
*H04L 29/08*    (2006.01)
*H04L 12/28*    (2006.01)

(52) U.S. Cl.
CPC ..... *G06Q 30/0269* (2013.01); *H04L 12/2812* (2013.01); *H04L 12/2829* (2013.01); *H04L 12/2834* (2013.01); *H04L 67/12* (2013.01); *H04L 67/22* (2013.01)

(58) Field of Classification Search
CPC ...................................................... G06Q 30/10
See application file for complete search history.

(56) References Cited

U.S. PATENT DOCUMENTS

| | | | |
|---|---|---|---|
| 8,280,891 B1 | 10/2012 | Urbach et al. | |
| 8,612,517 B1 | 12/2013 | Yadid et al. | |
| 2007/0255630 A1* | 11/2007 | Zalewski | A63F 13/10 705/26.1 |
| 2010/0293052 A1* | 11/2010 | DiOrio | G06Q 30/00 705/14.53 |
| 2010/0306023 A1* | 12/2010 | Grigoroscuta | G06Q 30/02 705/14.54 |
| 2012/0136719 A1* | 5/2012 | Ramakrishna | G06Q 30/02 705/14.49 |
| 2013/0290110 A1* | 10/2013 | LuVogt | G06F 17/30867 705/14.66 |
| 2013/0336520 A1* | 12/2013 | Vanhoucke | G06Q 30/02 382/100 |
| 2014/0279047 A1* | 9/2014 | Wang | G06Q 30/0269 705/14.66 |

\* cited by examiner

*Primary Examiner* — Eric R Netzloff
(74) *Attorney, Agent, or Firm* — Kilpatrick Townsend & Stockton LLP

(57) ABSTRACT

In one embodiment, a computing system may operate within a local area network. The computing system may include a network interface configured to receive a set of content items from a content server located remotely from the computing system and the local area network, a storage element for storing the set of content items, and a processor. The processor may be configured to determine first data relating to people, objects, or some combination thereof, select at least one content item from the set of content items based at least in part on the first data relating to people, objects, or some combination thereof without communicating the first data to the content server or any other computing device outside of the local area network, and communicate the selected at least one content item to a user of the computing system.

15 Claims, 9 Drawing Sheets

PRIVACY-AWARE PERSONALIZED CONTENT FOR THE SMART HOME

BACKGROUND

This disclosure relates to smart-device environments. In particular, this disclosure relates to privacy-aware personalized content for smart-device environments.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

People interact with a number of different electronic devices on a daily basis. In a home setting, for example, a person may interact with computers, smart televisions, tablets, smart thermostats, lighting systems, alarm systems, entertainment systems, and a variety of other electronic devices. The smart electronic devices may present advertisements and/or other content. In some instances, to enhance the rate of converting user viewing of the content to user interaction with the content, the content may be directed towards known preferences of the user (e.g., directed advertising). However, there generally may not be enough detailed information available relating to the user's personal interests to provide more relevant content. Further, privacy concerns and limitations may limit the collection of certain historical data on users.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

According to embodiments of this disclosure, a smart-device environment (e.g., smart-home) may include smart-devices communicably coupled to each other via one or more networks. For example, the smart devices may be in communication with each other over a private network (e.g., local area network (LAN)) or a public network, such as the Internet. Further, the smart devices may be in communication with device and/or servers external to the smart-device environment, such as servers, via the Internet.

Various embodiments relate to providing a private network within the smart-device environment that enables communicating data between devices in the private network without leaking outside of the private network. In some embodiments, the private network may include at least one first device that captures information about its surrounding environment, such as data about the people and/or objects in the environment. The first device may receive a set of potential content sent from a server external to the private network. The first device may select at least one piece of content to present from the set of potential content based in part on the people/object data and/or a score assigned by the server to each piece of content. The private network may also include at least one second device that receives the captured people/object data sent from the first device. The second device may also receive a set of potential content sent from the server external to the private network. The second device may select at least one piece of content to present from the set of potential content based in part on the people/object data sent from the first device and/or a score assigned by the server to each piece of content. Using the private network to communicate the people/object data between devices may preserve the privacy of the user since the data is not sent to the external server. Further, using the obtained people/object data to select content enables more personalized content to be chosen.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relate to smart-device environments (e.g., smart-home). In particular, a smart-device environment may be provided with a private network that includes one or more smart devices communicably coupled to each other. At least one of the smart devices may display content provided by a server external to the private network based on data obtained from the environment surrounding the smart device, such as from people and/or objects in the environment. The smart device may obtain the data via one or more sensors, may receive the data from another smart device that captures the data via one or more sensors, and/or may receive the data from one or more processing devices. In some embodiments, the content that is presented by a smart device may be considered "privacy-aware" because the device selects content using data encapsulated in the private network without sending the data outside of the private network (e.g., to an external server). Additionally, as described in detail below, the content that is selected using the people/object data from the environment may provide the benefit of being personalized to various users within the smart home environment.

Smart Building Environment

Figure 1:
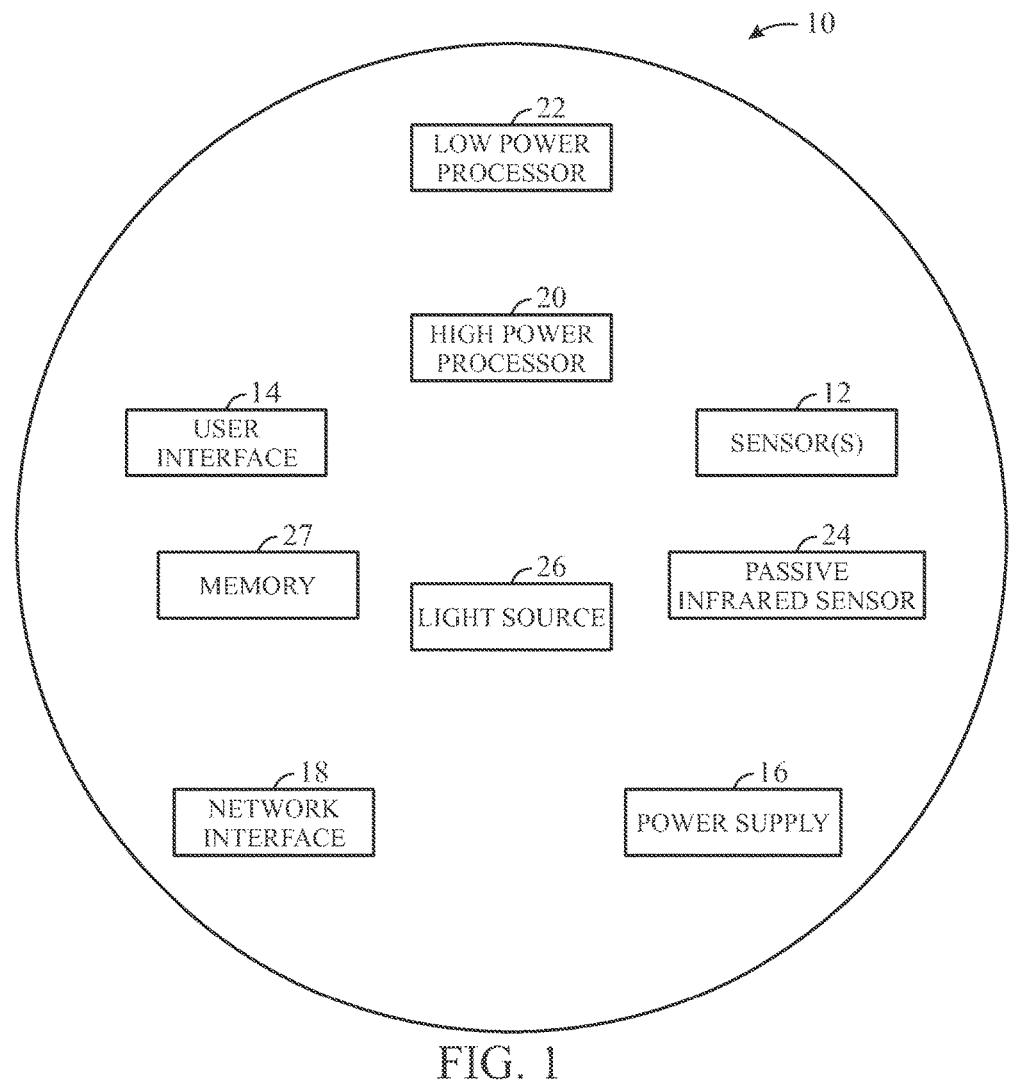
FIG. 1 is a block diagram of a smart home device, in accordance with an embodiment.

By way of introduction, FIG. 1 illustrates an example of a general device 10 that may be disposed within a building environment. In one embodiment, the device 10 may include one or more sensors 12, a user-interface component 14, a power supply 16 (e.g., including a power connection and/or battery), a network interface 18, a high-power processor 20, a low-power processor 22, a passive infrared (PIR) sensor 24, a light source 26, a memory 27, and the like.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, visual features, textures, optical character recognition (OCR) signals, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s), haptic sensors, OCR sensors, or RF identification detector(s). While FIG. 1 illustrates an embodiment with a single sensor, many embodiments may include multiple sensors. In some instances, the device 10 may include one or more primary sensors and one or more secondary sensors. Here, the primary sensor(s) may sense data central to the core operation of the device (e.g., visual/audio/haptic data about people and/or objects), while the secondary sensor(s) may sense other types of data (e.g., temperature, RF, location (GPS), characters (OCR)), which can be used for privacy-aware personalized content objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of user-interface components 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices. As such, the network interface 18 may enable the device 10 to communicate with other devices 10 via a wired or wireless network. The network interface 18 may include a wireless card or some other transceiver connection to facilitate this communication. In some embodiments, the network interface 18 may enable communicating over a private network, public network, or some combination thereof.

The high-power processor 20 and the low-power processor 22 may support one or more of a variety of different device functionalities. As such, the high-power processor 20 and the low-power processor 22 may each include one or more processors configured and programmed to carry out and/or cause to be carried out one or more of the functionalities described herein. In one embodiment, the high-power processor 20 and the low-power processor 22 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. In certain embodiments, the high-power processor 20 may execute computationally intensive operations such as operating the user-interface component 14 and the like. The low-power processor 22, on the other hand, may manage less complex processes such as detecting a hazard or temperature from the sensor 12. In one embodiment, the low-power processor may wake or initialize the high-power processor for computationally intensive processes.

By way of example, the high-power processor 20 and the low-power processor 22 may detect when a location (e.g., a house or room) is occupied (i.e., includes a presence of a human), up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or the like. Moreover, the high-power processor 20 and the low-power processor 22 may include image recognition technology to identify particular occupants or objects.

In certain embodiments, the high-power processor 20 and the low-power processor 22 may detect the presence of a human using the PIR sensor 24. The PIR sensor 24 may be a passive infrared sensor that may measures infrared (IR) light radiating from objects in its field of view. As such, the PIR sensor 24 may detect the Infrared radiation emitted from an object.

In some instances, the high-power processor 20 may predict desirable settings and/or implement those settings. For example, based on the presence detection, the high-power processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying). In another embodiment, a first device may detect certain features of a person and/or object and transmit the feature data to a second device that selects content to display based at least partly on the features.

In addition to detecting various types of events, the device 10 may include a light source 26 that may illuminate when a living being, such as a human, is detected as approaching. The light source 26 may include any type of light source such as one or more light-emitting diodes or the like. The light source 26 may be communicatively coupled to the high-power processor 20 and the low-power processor 22, which may provide a signal to cause the light source 26 to illuminate.

The memory 27 may be any suitable article of manufacture that can serve as media to store processor-executable code, data, or the like. These articles of manufacture may represent tangible, non-transitory, computer-readable media (e.g., any suitable form of memory or storage) that may store the processor-executable code used by the high-power processor 20 and the low-power processor 22 to perform the presently disclosed techniques. The memory 27 may also be used to store received communication data from devices 10 in order to perform the privacy-aware personalized content for a smart-device environment discussed in detail below. Also, the memory 27 may store sets of content received from a server external to the private network to perform the features disclosed herein.

Figure 2:
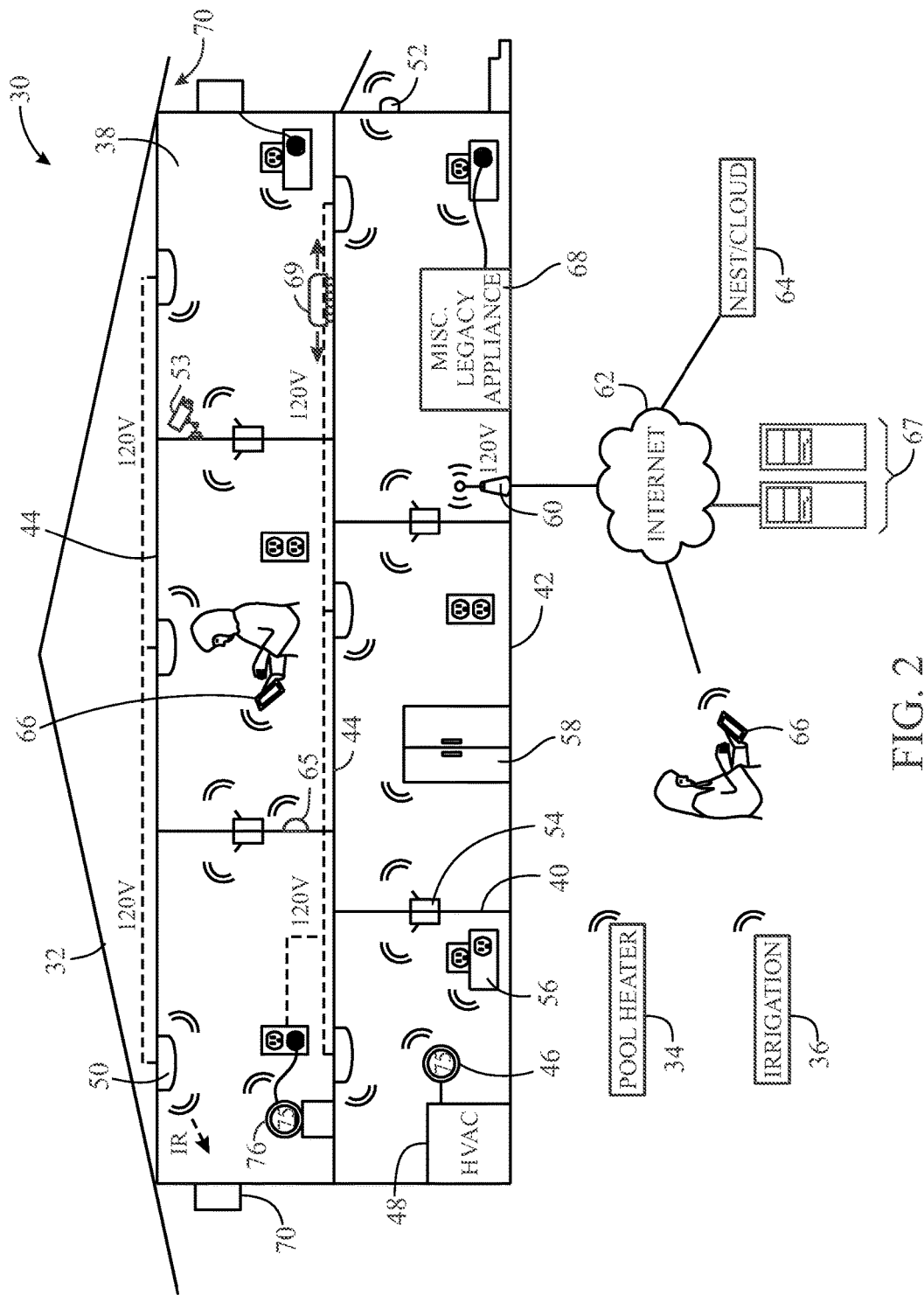
FIG. 2 is a block diagram of a connected smart home environment that includes a number of smart home devices, in accordance with an embodiment.

Keeping the foregoing in mind, FIG. 2 illustrates an example of a smart-device environment 30 within which one or more of the devices 10 of FIG. 1, methods, systems, services, and/or computer program products described further herein can be applicable. The depicted smart-device environment 30 includes a structure 32, which can include, e.g., a house, office building, garage, or mobile home. It will be appreciated that devices can also be integrated into a smart-device environment 30 that does not include an entire structure 32, such as an apartment, condominium, or office space. Further, the smart home environment can control and/or be coupled to devices outside of the actual structure 32. Indeed, several devices in the smart home environment need not physically be within the structure 32 at all. For example, a device controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42 or ceiling 44.

In some embodiments, the smart-device environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-device environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), one or more intelligent, multi-sensing, network-connected entryway interface devices 52 (hereinafter referred to as "smart doorbells 52"), and one or more intelligent, multi-sensing, network-connected video cameras 53 (hereinafter referred to as "smart video cameras 53"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensors 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-device environment 30.

The smart video camera 53 may be located inside or outside of the structure 32, as depicted. The smart video camera 53 may be wireless (e.g., Wifi) and/or wired and configured to communicate with one or more devices 10 in the smart home environment 30. Also, the smart video camera 53 may be configured to buffer video and record and send video to user devices 66 via the Internet 62 and/or a central server or cloud-computing system 64. Additionally, a software application may be installed on user devices 66 that is configured to access a live feed of the smart video camera 53 so that a user may view current footage. The smart video camera 53 may include a microphone and a speaker in order to enable two-way talk between the smart video camera 53 and a user of the application. Further, the smart video camera 53 may be battery-powered or hard-wired and include infrared LEDs that enable night-vision. In addition, the smart video camera 53 may be configured to provide alerts to a subscribed or interested user of newly recorded available footage (e.g., configurable detected activities). For example, an outdoor smart video camera 53 may communicate with the smart doorbell 52 so that any time the smart doorbell 52 is rung and the user is not home, the smart video camera 53 may send the video data a configurable amount of time before the smart doorbell 52 was rung and a configurable amount of time after the smart doorbell 52 was rung to the user. In this way, the user may determine who visited the home while they are away.

In some embodiments, the smart-device environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-device environment 30 may further include a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-device environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-device environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-device environment 30 are modular and can be incorporated into older and new houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-device environment 30 may also include communication with devices outside of the physical home but within a proximate geographical range of the home. For example, the smart-device environment 30 may include a pool heater monitor 34 that communicates a current pool temperature to other devices within the smart-device environment 30 or receives commands for controlling the pool temperature. Similarly, the smart-device environment 30 may include an irrigation monitor 36 that communicates information regarding irrigation systems within the smart-device environment 30 and/or receives control information for controlling such irrigation systems. According to embodiments, an algorithm is provided for considering the geographic location of the smart-device environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-device environment 30 using a network-connected computer or portable electronic device 66. In some examples, some or all of the occupants (e.g., individuals who live in the home) can register their device 66 with the smart-device environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-device environment 30 makes inferences about which individuals live in the home and are therefore occupants and which devices 66 are associated with those individuals. As such, the smart-device environment "learns" who is an occupant and permits the devices 66 associated with those individuals to control the smart devices of the home.

In some embodiments, the smart-device environment 30 may be in communication with one or more servers 67 that supply content to a device 10 (e.g., portable electronic device 66, TV, computer) within a private network utilized amongst devices 10 within the environment 30. The devices 10 that receive the content from the servers 67 may select at least a piece of the content to display based on people and/or object data obtained via sensors or received from another device 10 within the environment 30, a score assigned by the server to each piece of content, or both.

In some instances, guests desire to control the smart devices. For example, the smart-device environment may receive communication from an unregistered mobile device of an individual inside of the home, where said individual is not recognized as an occupant of the home. Further, for example, a smart-device environment may receive communication from a mobile device of an individual who is known to be or who is registered as a guest.

According to embodiments, a guest-layer of controls can be provided to guests of the smart-device environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the present disclosure, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 66. For example, the smart device, such as the smart thermostat, may be equipped with walkup-identification technology (e.g., facial recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature setpoints for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, Home-Plug, etc.).

According to embodiments, all or some of the smart devices can serve as wireless or wired repeaters. For example, a first one of the smart devices can communicate with a second one of the smart device via a wireless router 60. The smart devices can further communicate with each other via a connection to a network, such as the Internet 62, or a private network. Through the Internet 62, the smart devices can communicate with a central server or a cloud-computing system 64. The central server or cloud-computing system 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals).

According to embodiments, the smart devices combine to create a mesh network of spokesman and low-power nodes in the smart-device environment 30, where some of the smart devices are "spokesman" nodes and others are "low-powered" nodes. Some of the smart devices in the smart-device environment 30 are battery powered, while others have a regular and reliable power source, such as by connecting to wiring (e.g., to 120V line voltage wires) behind the walls 40 of the smart-device environment. The smart devices that have a regular and reliable power source are referred to as "spokesman" nodes. These nodes are equipped with the capability of using any wireless protocol or manner to facilitate bidirectional communication with any of a variety of other devices in the smart-device environment 30 as well as with the central server or cloud-computing system 64. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-device environment 30, such as the spokesman nodes, cannot send information to these low-power nodes.

As described, the smart devices serve as low-power and spokesman nodes to create a mesh network in the smart-device environment 30. Individual low-power nodes in the smart-device environment regularly send out messages regarding what they are sensing, and the other low-powered nodes in the smart-device environment—in addition to sending out their own messages—repeat the messages, thereby causing the messages to travel from node to node (i.e., device to device) throughout the smart-device environment 30. The spokesman nodes in the smart-device environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-device environment 30 as well as over the Internet 62 to the central server or cloud-computing system 64. According to embodiments, the mesh network enables the central server or cloud-computing system 64 to regularly receive data from all of the smart devices in the home, make inferences based on the data, and send commands back to one of the smart devices to accomplish some of the smart-home objectives described herein. As may be appreciated, the people and/or object data that is obtained via sensing by the devices 10 and used to select content to display may not be provided to the servers 67 or the central server or cloud-computing system 64 according to privacy policies and/or settings.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-device environment 30. The spokesman nodes drop down to a low-power protocol to communicate the commands to the low-power nodes throughout the smart-device environment, as well as to other spokesman nodes that did not receive the commands directly from the central server or cloud-computing system 64.

An example of a low-power node is a smart nightlight 65. In addition to housing a light source, the smart nightlight 65 houses an occupancy sensor, such as an ultrasonic or passive IR sensor, and an ambient light sensor, such as a photoresistor or a single-pixel sensor that measures light in the room. In some embodiments, the smart nightlight 65 is configured to activate the light source when its ambient light sensor detects that the room is dark and when its occupancy sensor detects that someone is in the room. In other embodiments, the smart nightlight 65 is simply configured to activate the light source when its ambient light sensor detects that the room is dark. Further, according to embodiments, the smart nightlight 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-device environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 53, 54, 56, 58, 59, and 65) can function as "tripwires" for an alarm system in the smart-device environment. For example, in the event a perpetrator circumvents detection by alarm sensors located at windows, doors, and other entry points of the smart-device environment 30, the alarm could be triggered upon receiving an occupancy, motion, heat, sound, etc. message from one or more of the low-powered and spokesman nodes in the mesh network. For example, upon receiving a message from a smart nightlight 65 indicating the presence of a person, the central server or cloud-computing system 64 or some other device could trigger an alarm, provided the alarm is armed at the time of detection. Also, if the smart video camera 53 detects movement inside or around the house, the central server or cloud-computing system 64 or some other device could trigger an alarm. Thus, the alarm system could be enhanced by various low-powered and spokesman nodes located throughout the smart-device environment 30. In this example, a user could enhance the security of the smart-device environment 30 by buying and installing extra smart nightlights 65.

In some embodiments, the mesh network can be used to automatically turn on and off lights as a person transitions from room to room. For example, the low-powered and spokesman nodes detect the person's movement through the smart-device environment and communicate corresponding messages through the mesh network. Using the messages that indicate which rooms are occupied, the central server or cloud-computing system 64 or some other device activates and deactivates the smart wall switches 54 to automatically provide light as the person moves from room to room in the smart-device environment 30. Further, users may provide pre-configuration information that indicates which smart wall plugs 56 provide power to lamps and other light sources, such as the smart nightlight 65. Alternatively, this mapping of light sources to smart wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-device environment 30. For example, for each room in the house, the user provides a map of the best exit route. It should be appreciated that instead of a user providing this information, the central server or cloud-computing system 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system 64 or some other device uses occupancy information obtained from the low-powered and spokesman nodes to determine which rooms are occupied and then turns on lights (e.g., smart nightlights 65, smart wall switches 54, smart wall plugs 56 that power lamps, etc.) along the exit routes from the occupied rooms so as to provide emergency exit lighting.

Further included and illustrated in the smart-device environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, serving as a waiter by retrieving items (e.g., food, drinks) to the user, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and facial recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 2. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-device environment 30 in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-device environment 30 that happens to be closest to the occupant when the occupant falls asleep will be the device that transmits messages regarding when the occupant stopped moving, from which the central server or cloud-computing system 64 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-device environment in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-device environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud-computing system 64 analyze the person's migration data collected by the mesh network of the smart-device environment to identify such patterns.

Figure 3:
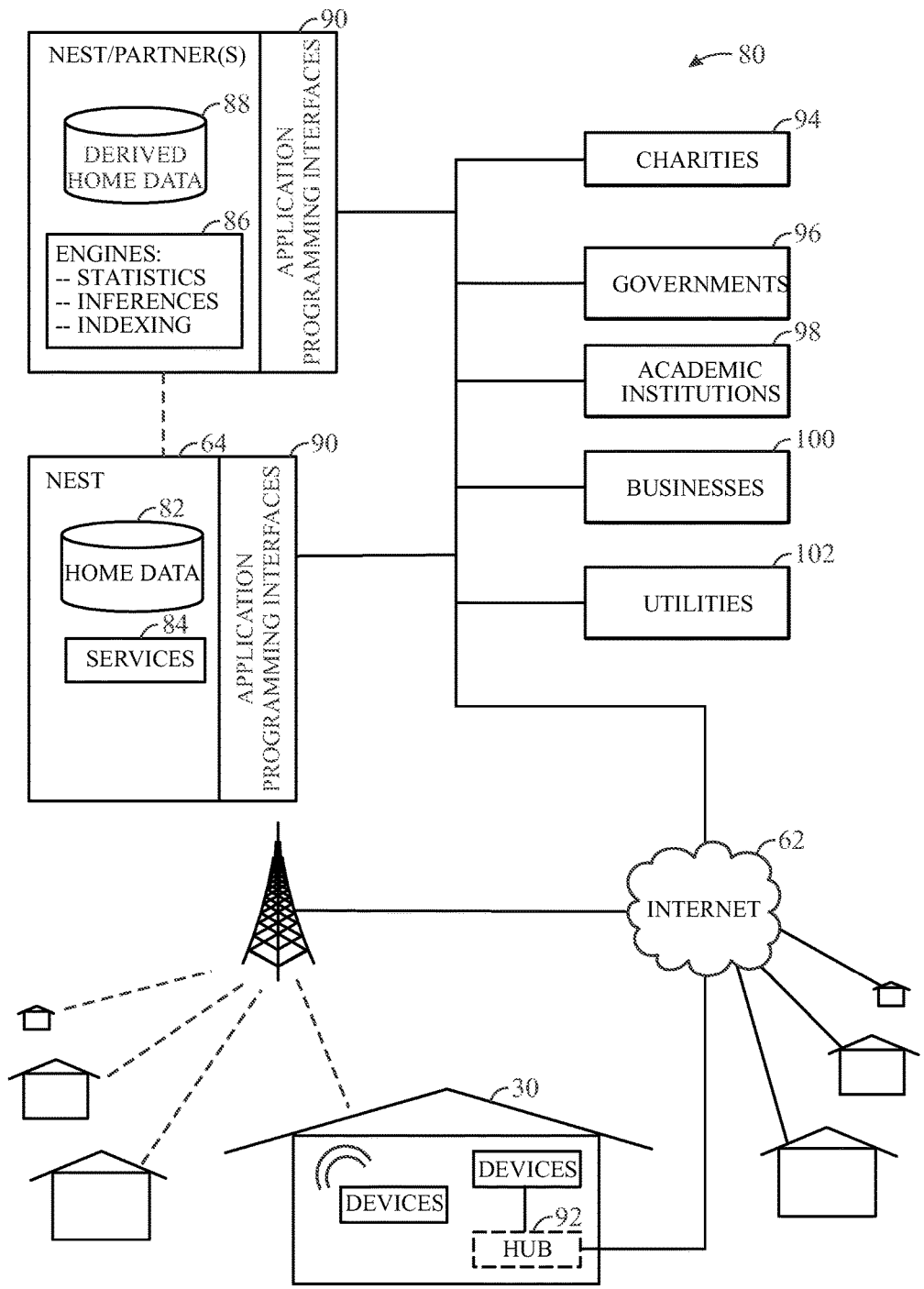
FIG. 3 is a block diagram illustrating a manner of controlling and/or accessing the smart home environment using services over the internet, in accordance with an embodiment.

In addition, FIG. 3 illustrates an embodiment of an extensible devices and services platform 80 that can be concentrated at a single server or distributed among several different computing entities without limitation with respect to the smart-device environment 30. The extensible devices and services platform 80 may include a processing engine 86, which may include engines that receive data from devices of smart-device environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing system 64 receives data indicating that a particular home has been broken into, is experiencing a fire, or some other type of emergency event, an alarm is sent to other smart homes in the "neighborhood." In some instances, the central server or cloud-computing system 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing system 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing system 64 makes inferences about water usage in the home and provides related services. For example, the central server or cloud-computing system 64 can run programs/algorithms that recognize what water sounds like and when it is running in the home. According to one embodiment, to map the various water sources of the home, upon detecting running water, the central server or cloud-computing system 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing system 64 to determine the "signature" or "fingerprint" of each water source in the home. This is sometimes referred to herein as "audio fingerprinting water usage."

In one illustrative example, the central server or cloud-computing system 64 creates a signature for the toilet in the master bathroom, and whenever that toilet is flushed, the central server or cloud-computing system 64 will know that the water usage at that time is associated with that toilet. Thus, the central server or cloud-computing system 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing system 64 makes inferences about pest-detection in the home and provides related services. For example, the central server or cloud-computing system 64 can run programs/algorithms that recognize what certain pests sound like, how they move, and/or the vibration they create, individually and/or collectively. According to one embodiment, the central server or cloud-computing system 64 can determine the "signatures" of particular types of pests.

For example, in the event the central server or cloud-computing system 64 detects sounds that may be associated with pests, it notifies the occupants of such sounds and suggests hiring a pest control company. If it is confirmed that pests are indeed present, the occupants input to the central server or cloud-computing system 64 confirms that its detection was correct, along with details regarding the identified pests, such as name, type, description, location, quantity, etc. This enables the central server or cloud-computing system 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing system 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps, that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
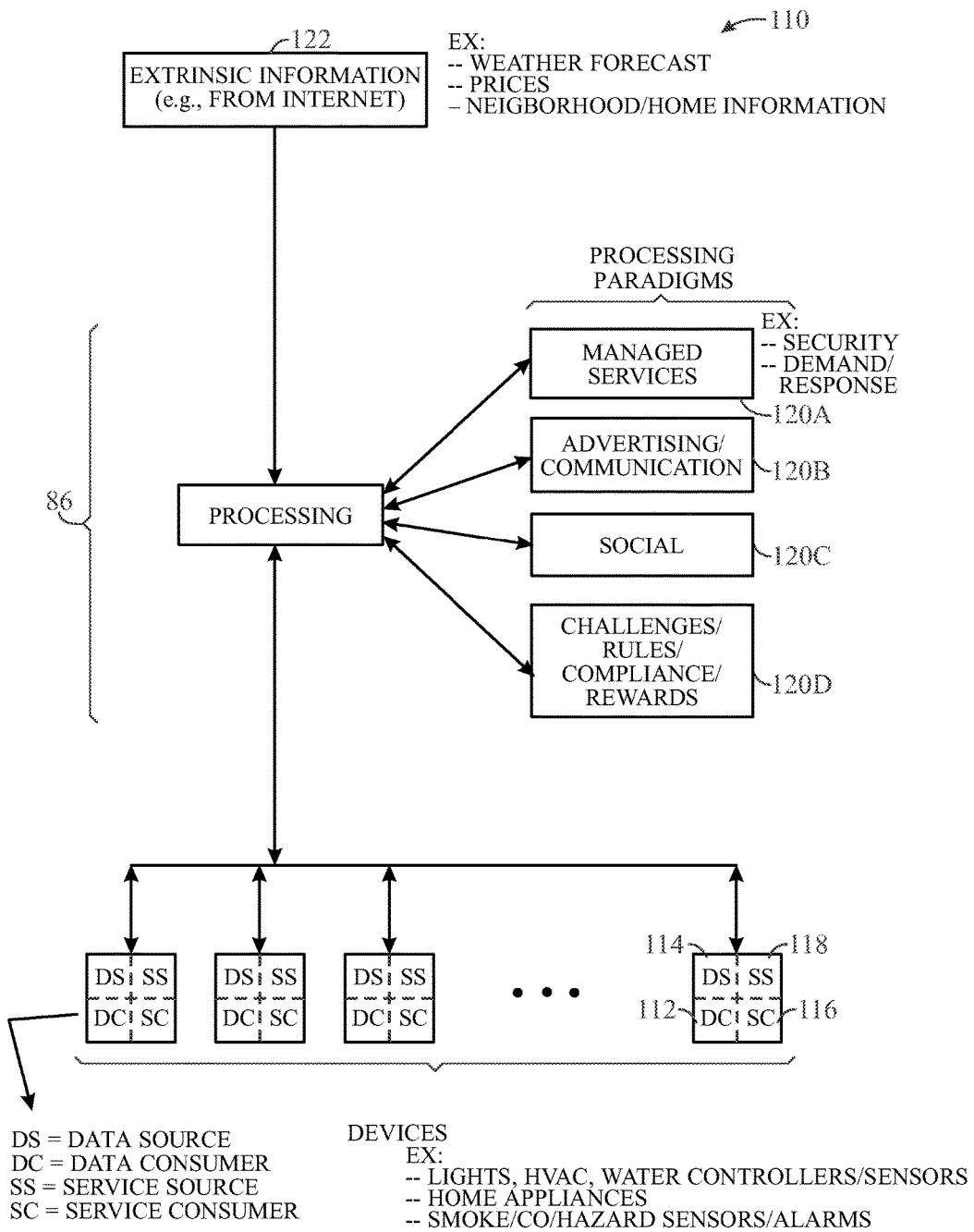
FIG. 4 is a block diagram of processing paradigms that may be used to control devices of the smart home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-device environment 30 of FIG. 2. Even though devices situated in smart-device environments 30 will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120*a* that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120*b* that estimates characteristics (e.g., demographic information), desires and/or products of interest of a user based on device usage. Services, promotions, products or upgrades can then be offered or automatically provided to the user. Processing engine 86 can further include a social paradigm 120*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-device environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

As previously discussed, the described extensible devices and services platform may enable communicating emergency information between smart-device environments 30 that are linked and/or to the proper authorities. For example, when a burglar breaks into a smart-device environment 30, a home security system may trip and sound an alarm and/or send emergency notifications to the neighbors, the police, the security company, and the like.

Privacy-Aware Personalized Content for a
Smart-Device Environment

Figure 5:
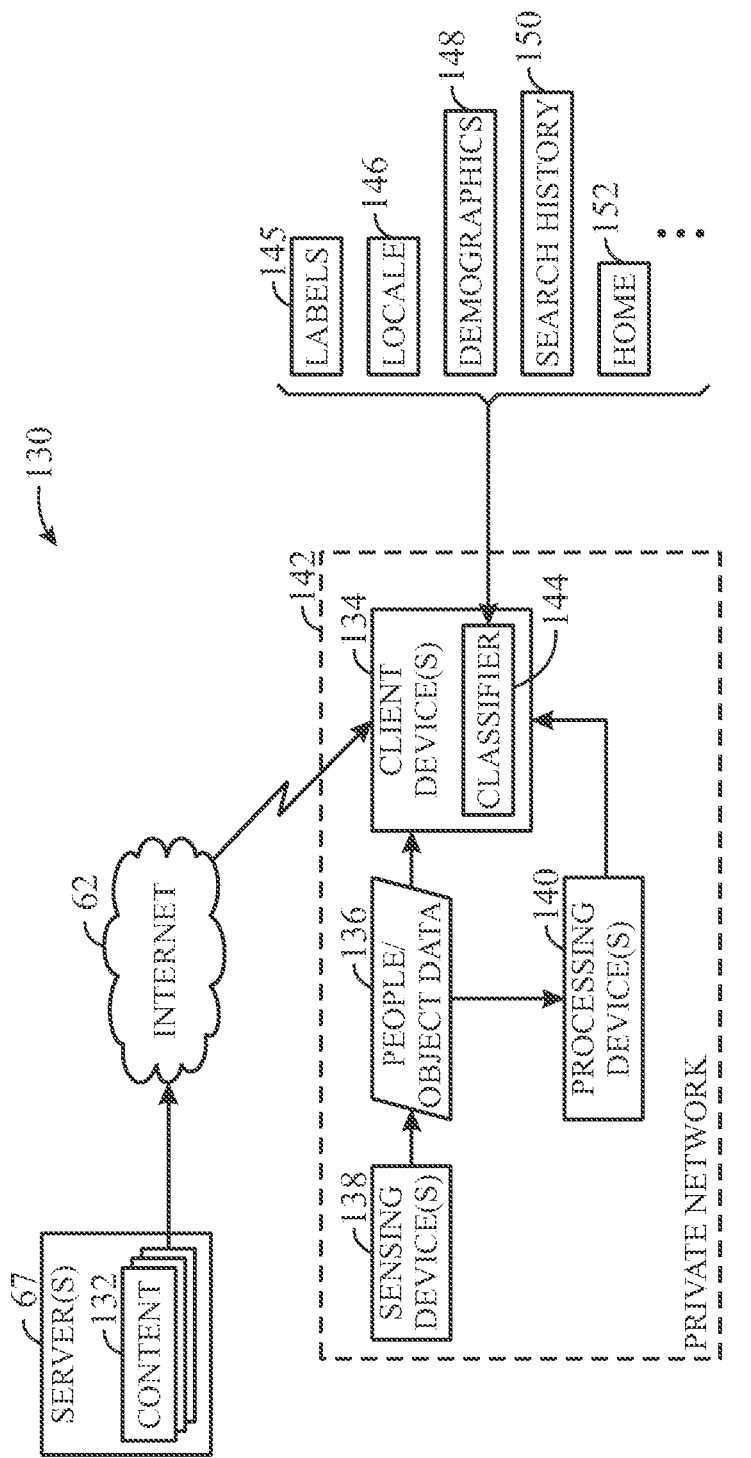
FIG. 5 is a schematic drawing of a system that provides privacy-aware content via smart devices in a smart home environment, in accordance with an embodiment.

Having discussed the smart-device environment 30, the discussion now turns to providing privacy-aware personalized content via smart devices 10. FIG. 5 is a schematic drawing of a system 130 that provides privacy-aware content 132 to an occupant via smart devices in the smart home environment 30, in accordance with an embodiment. Generally, the system 130 may enable providing a set of content 132 via the one or more servers 67 to one or more client devices 134. The one or more servers 67 may provide the set of content 132 via a network, such as the Internet 62, to the client devices 134. The set of content 132 may include numerous different types of content 132. For example, the types of content 132 in the set of content 132 may include advertisements, movie/television show recommendations, shopping recommendations, application (e.g., Google Now) alerts, and/or modified search results rankings, among others. The client devices 134 may include any suitable electronic devices, including those described as the smart devices 10 discussed above within the smart-device environment 30. However, for explanatory purposes, the client devices 134 referred to in the discussion below may include a smartphone, a tablet, a laptop, and/or a smart TV.

The client devices 134 may receive people/object data 136 from one or more sensing devices 138, one or more processing devices 140, and/or obtain the people/object data 136 via sensors included in the client devices 134. People/object data 136 generally refers to data obtained about people and/or objects within the smart home environment and/or within proximity to the smart home environment 30 that may be shared between devices communicating over a private network. For example, people/object data 136 may relate to a person's age, gender, identification, and/or an object's class, textual information, and/or other visual properties discernible using one or more recognition techniques (e.g., facial, voice, character, object, pattern). In some embodiments, any number of sensing devices 138 (e.g., 1, 2, 3, 4, 5, 6, or more) may provide people/object data 136 captured within the smart home environment 30 and/or within proximity to the smart home environment 30.

It should be understood that, in some embodiments, raw people/object data 136 (e.g., visual, audio, haptic measurements) captured may be processed (e.g. object recognition, pattern recognition, etc.) by the sensing devices 138 before being sent to the client devices 134, by the client devices 134 upon receiving the raw people/object data 136 from the sensing devices 138, or some combination thereof. Further, in an embodiment, the raw people/object data 136 may be partially or wholly processed by one or more processing devices 140, such as a home computer, prior to being sent to the client devices 134 depending on the implementation. The processing devices 140 may include larger processors capable of more computationally intensive operations and calculations. The raw people/object data 136 may refer to an unprocessed data stream obtained by the sensing device 138 that may undergo processing (e.g., facial recognition, voice recognition, optical character recognition, object recognition, and/or pattern recognition) to obtain the people/object data 136. For example, processed people/object data 136 may include a particular person's ID determined based on facial recognition or an object's class (e.g., musical instrument) based on object recognition.

The client devices 134 and the sensing devices 138 may be communicably coupled via a private network 142 (e.g., a network that uses private Internet Protocol (IP) address space). As such, the people/object data 136 may be contained between client devices 136, sensing devices 138, and/or processing devices 140 within the private network 142 without being communicated to servers 67 external to the private network 142. The private network 142 may include a private communication protocol used between the client devices 134 and the sensing devices 138. For example, the private network 142 may include a local area network (LAN) that the devices 134, 138, and/or 140 use to communicate. In some embodiments, a virtual private network (VPN) may be established and the devices 134, 138, and/or 140 may communicate using the VPN. In such an embodiment, the VPN may be used to extend the area of use beyond the smart home environment 30 so that client devices 134 may present personalized content 132 using people/object data 136 obtained external to the smart home environment 30. In some embodiments, any application level protocol may be used that can specify which devices desire to share data and providing the IP address of each device so that data is only shared between those devices. Further, a personal area network (PAN) may be created and a PAN identifier (ID) may be specified so that only devices communicating with the same PAN ID is enabled.

Thus, while rich information about the users (e.g., people/object data 136) is collected, none of it may be passed to the backend servers 67. That is, the people/object data 136 may be inaccessible outside of the private network 142. In this way, the privacy of the users' data related to the people and objects within and around the smart-device environment 30 may be protected subject to enforced privacy conditions.

In some embodiments, the client devices 134 select at least one piece of content 132 based at least in part on the people/object data 136, scores assigned by the server 67 to each piece of content 132, or both. The various people/object data 136 and/or scores may be combined to determine a final score of each piece of content 132. In some embodiments, as discussed in detail below, a classifier 144 of the client device 134 may be trained using at least the people/object data 136 and used to determine the final score for each piece of content 132. As discussed in more detail below, using information gleaned from actual people and objects located in and around the user's home may enable providing highly personalized content 132 because there may be a higher probability that the user prefers content 132 related to properties of the people and objects in and around their actual home than if the content 132 is not related to properties of the people and objects.

It should be noted that, in some embodiments, the client devices 134 may include a selectable system mode that enables turning on and off the selection and communication of the personalized content. This feature may be used when there are guests present in the smart home environment 30 and enables the owner of the home to turn off personalization of communicated content so that content that is communicated is not based on the people/object data 136. In these embodiments, the content 132 may be selected and communicated to users of the client devices 134 based solely off of scores provided by the server 67 (e.g., content server).

The classifier 144 may use any suitable classification (e.g., binary classification) to group the individual content 132 of the set of content 132 into one of two groups using a classification rule. To achieve this, the classifier 144 may include a support vector machine (SVM) that uses machine learning to determine whether to present content 132 or not. The SVM may include supervised learning models that analyze data and recognize patterns to classify the data. For example, the classifier 144 may be trained with the people/object data 136 and associated labels 145, such as "show" and "don't show" being based on user conversion for the displayed content 132 (e.g., pattern recognition). In some embodiments, the content 132 may be interactive and user conversion may be measured by the client devices 134 based on whether the user interacted with the content 132.

In some embodiments, one classifier 144 may be trained for all smart homes, for a specific smart home, and/or for each device configuration. Also, the classifier 144 may incorporate additional data when being trained. For example, the classifier 144 may incorporate parameters/preferences related to locale 146, demographics 148, search history 150, the specific home 152, and so forth. The parameters, such as locale 146 and demographics 148, and the preferences, such as the search history 150, may be used to train the classifier 144 to score relevant content 132 to the user higher.

Locale information 146 may provide the classifier 144 with a geographical indication of where the client device 134 is located so the classifier 144 may score content 132 that is relevant to that region higher. The demographic 148 (e.g., gender, age, ethnicity, knowledge of languages, disabilities, mobility, employment status, home ownership, location, etc.) information may be useful when training the classifier 144 so the classifier 144 may score content 132 that is more relevant to the user's demographics. Also, search history 150 on a browser, set-top box (e.g., cable box), application program online store, and so forth, may be used to glean user preferences for certain information (e.g., TV shows, movies, music, apps, any searchable information), which may be used when training the classifier 144 to score relevant content 132 higher. Further, the home information 152 may include, but is not limited to, the types of smart devices installed in the home, energy information (usage, efficiency, types (green, non-green), preferences), schedules (home, away), occupancy, activities (watch TV, read books, play board games, sleep, eat, etc.), which may be used when training the classifier 144 to score the content 132.

Once each piece or a subset of potential content 132 is scored by the classifier 144, the client device 134 may select the content 132 with the highest score to display on the client device 134. The client device 134 may track user interaction, or lack thereof, with the selected content 132 to continuously train the classifier 144 so that the classifier 144 is up to date with the user's latest preferences.

Figure 6:
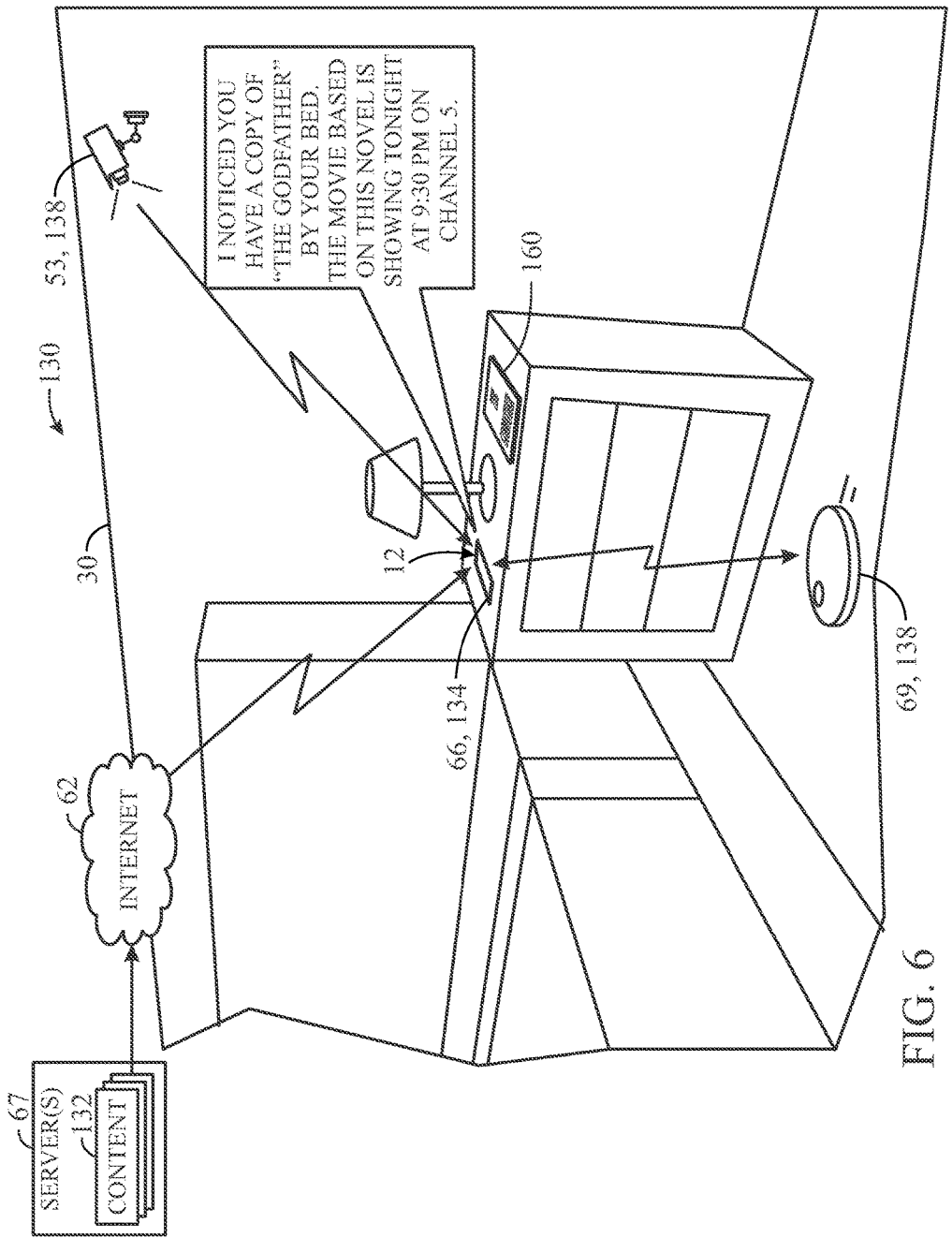
FIG. 6 is a schematic drawing of the system of FIG. 5 providing privacy-aware content via a smart device, in accordance with an embodiment.

FIG. 6 is a schematic drawing of the system 130 of FIG. 5 providing privacy-aware content 132 via a smart device, in accordance with an embodiment. As previously discussed, the system 130 may enable selecting at least some content 132 from a set of content 132 sent from servers 67 to display via a client device 134 based at least on people/object data 136.

In some embodiments, the people/object data 136 may be obtained by the client device 134 via one or more sensors 12 and/or provided by one or more sensing devices 138 and/or one or more processing devices 140 in the private network 142. In one embodiment, one or more sensing devices 138 may sense various visual, audio, haptic, temperature, radio frequency (RF), location, and/or textual properties of people and/or objects in and around the smart-device environment 30 and send that data to the client device 134. The client device 134 may use the people/object data 136 to score each piece of content 132 provided by the servers 67 and select at least a piece of the content 132 to present (e.g., display, play).

To illustrate, in the depicted embodiment, a sensing device 138, such as the smart video camera 53, may use its sensor (e.g., camera) and processor to perform object recognition, pattern recognition, optical character recognition (OCR), and the like. As may be appreciated, OCR may refer to the electronic conversion of typewritten or printed text to computer-readable text. For example, the smart video camera 53 may use OCR to ascertain that the book 160 on the user's bedside table is titled "The Godfather." The smart video camera 53 may send this object data 136 to the client device 134, which, in the depicted embodiment, may be a portable electronic device 66, such as a tablet, smartphone, laptop, etc.

Based at least on the received object data related to the book 160, scores assigned by the servers 67 to each piece of content 132 provided in the set of content 132, or both, the portable computing device 66 may rescore each piece of content 132 to provide higher scores to content more relevant to the user's preferences. As a result, the portable computing device 66 may select a TV/movie recommendation that received a high score in view of the information related to the book 160. For example, the following recommendation may be displayed, "I noticed you have a copy of 'The Godfather' by your bed. The movie based on this novel is showing tonight at 9:30 PM on channel 5."

As may be appreciated, the sensing devices 138 may be any other suitable smart device 10 previously discussed that includes one or more sensors and is enabled to discern a property of people and/or data. For example, another sensing device 138 may include a home robot 69. The robot 69 may be equipped with at least one sensor (e.g., camera), processor, memory, and network interface, as discussed above. While performing its house chores, the robot 69 may recognize objects (e.g., guitars, basketballs, books, food, etc.) and/or people. For example, the robot 69 may recognize a guitar in the user's home and the client device 134 may use this data to display a guitar-related advertisement. Further, the robot 69 may recognize the people in the house (e.g., using facial recognition software) and send their ID and/or properties (gender, age, appearance, voice) to the client device 134. Such data may be available, for example, to robots 69 that serve meals to family members according to their preferences because these robots 69 may recognize specific family members based on their appearance and voice.

In some embodiments, the robot 69 may use its sensors to measure sounds and appearance of people and/or objects in the room and send audio and/or visual features that can be used to assess properties of the objects and/or people. For example, for people, the audio and/or visual features may be used to ascertain gender, age, fashion-taste, style, mood, known languages, preferred activities, and so forth. For objects, the audio and/or visual features may be used to ascertain a class (e.g., music instruments, expensive mechanical and/or electronic devices, sports equipment, clothing, etc.). The properties and/or classes may be useful when selecting which content 132 to present by training the classifier 144 (previously discussed) using the properties, so that the classifier 144 may score content 132 related to the properties higher.

In another example, a sensing device 138 and/or client device may recognize a tee-shirt on a floor of the user's closet and recognize the face on the tee-shirt to be that of Will Smith. In addition, the client device may determine from browser search history that the user has searched for Will Smith recently. Accordingly, the client device may use the object data and the search history in combination to provide a movie recommendation that displays, "You seem to like Will Smith. His new movie is playing in a theater near you."

As may be appreciated, certain client devices 134 may be used by more than one person as a community device. For example, a smart TV may be used by numerous members of a family if it is located in a living room or family room. Thus, as discussed above, the sensing devices 138 may be enabled to detect occupancy and recognize specific people (e.g., voice and appearance (facial recognition)) to properly tailor and time content 132 presented by the client devices 134. That is, the timing of the content 132 presented may be based at least in part on when certain users are detected as being home and tailored to the specific user, the group of users (e.g., the family), or the subset of the group (e.g., the kids, the parents) that are present in the home.

To illustrate, a smart video camera 53 may detect that a fifteen year old boy (e.g., a middle son) holding a basketball has entered the room and turned on the smart TV. In response, the smart video camera 53 may send the ID of the middle son, his gender (male), age (fifteen), and the data related to the basketball to the client device 134. In response, the client device 134 may select content 132 based on the received people/object data 136 to present when there is a commercial break or the like. The content 132 selected may include an advertisement for a basketball camp at a local high school that starts in the upcoming summer, a new basketball video game, an announcement of the TV schedule for the local National Basketball League (NBA) team, and so forth.

In situations where more than one family member or person is located in the room, the client device 134 may default to family-related content 132 or select content 132 based on a user priority. For example, the client device 134 (e.g., smart TV), may select and display an advertisement for the local water park, amusement park, zoo, and/or provide a recommendation for a family-friendly movie or restaurant. Additionally or alternatively, when the client device 134 scores the content 132 based on priority, the preferences of the person with the highest priority (e.g., the mother, father, grandparent, etc.) may be used to score the content 132 provided by the server 67 so the content 132 that most closely matches their preferences is selected to be displayed.

It should be noted that if the client devices 134 are personal devices used mainly by the same person, such as a smartphone or a personal tablet/laptop, the client devices 134 may only consider or receive people/object data 136 related to that particular person's ID when selecting content 132 to display. This may inhibit displaying content 132 that is not relevant to the person who is the owner of the client device 134 or uses the client device 134 the majority of the time.

Further, the content 132 may be selected as tailored for any authorized guest, such as a babysitter, a dog walker, and so forth, that access control of the home when the users may be away. In some embodiments, the sensing devices 138 and/or the client devices 134 may determine that the authorized guest is present based on an ID (e.g., tied to the authorized guest's smartphone), an access code (e.g., smart lock), occupancy time, facial recognition, and/or any suitable identifier, and the client devices 134 may rescore the content 132 provided by the servers 67 to enable selecting content 132 that is suitable for the particular authorized guest. For example, an advertisement for new leashes may be displayed to the dog walker, TV show/movie suggestions may be displayed that are suitable for the babysitter (e.g., PG and G rated movies), and so forth.

Figure 7:
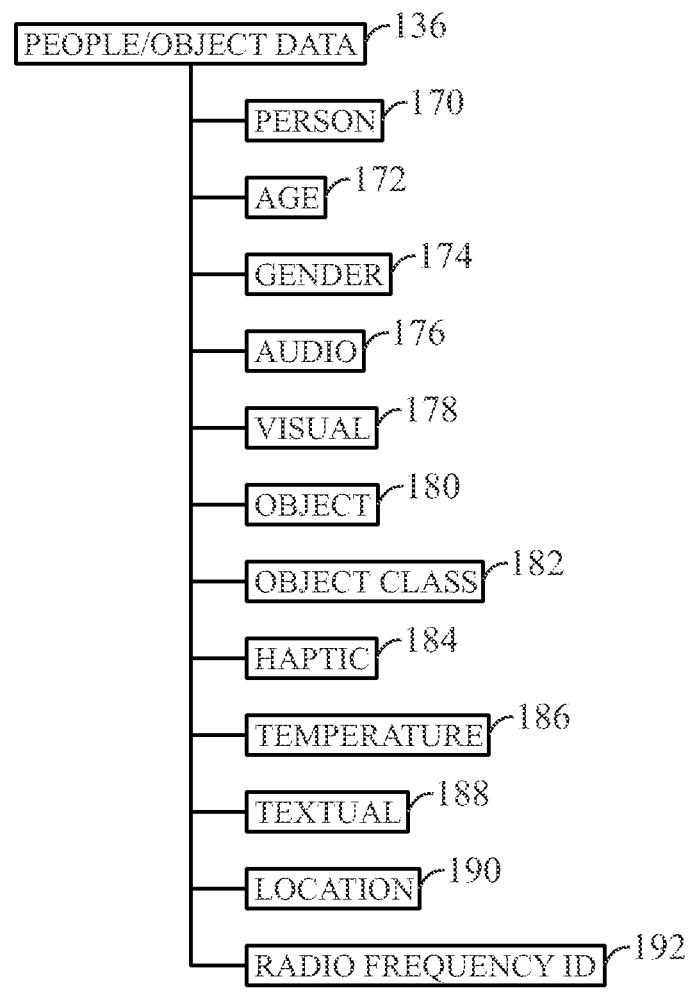
FIG. 7 is a schematic diagram of people/object data used by a smart device to determine which content to display, in accordance with an embodiment.

FIG. 7 is a schematic diagram of people/object data 136 used by a client device 134 to determine which content 132 to display, in accordance with an embodiment. As previously discussed, the people/object data 136 may be obtained via one or more sensors 12 included in the client device 134 and/or the sensing device 138. In cases where the sensing devices 138 obtain the people/object data 136, the sensing devices 138 may send the people/object data 136 to the client device 134 in the private network 142. As such, the privacy of the user may be protected by containing the people/object data 136 within the private network 142.

The client device 134 may use the people/object data 136 to aid in selecting content 132 that is relevant to the people and/or objects. For example, as discussed above, the client device 134 may train a classifier 144 that includes one or more models with the people/object data 136, and the classifier 144 may use the models to classify the content 132 with labels 145 such as "show" and "don't show" based on user conversion of the content 132, as discussed in more detail below.

A first people/object data 136 may include a person ID 170. In some embodiments, the person ID 170 may be determined by recognizing the person in the smart-device environment 30 based upon facial recognition, a signature signal (e.g., radio frequency (RF) ID) emitted by a device carried by the user (e.g., smartphone, wearable, RFID tag), voice, occupancy time, and so forth. In some embodiments, the person ID 170 may be based on certain appearance and audio data obtained via the sensors and discussed below regarding the other people/object data 136. Each person that accesses the smart-device environment 30 may be assigned a person ID 170. For example, each child in a family, the mother, the father, the grandparents, babysitter, dog walker, any guest, and so forth, may have a unique person ID 170 that may be used by the client device 134 when scoring the potential content 132 to provide personalized content 132 to the particular person.

A second people/object data 136 may include an age 172 of the people detected. The age of the people in the smart-device environment 30 may be preconfigured in the devices and/or determined by the devices using data obtained via one or more sensors (e.g., camera, microphone) and any suitable technique (e.g., determining the person's age based on features of their face and/or voice).

A third people/object data 136 may include a gender 174 of the user and/or users as detected via one or more sensors of the sensing devices 138 and/or client devices 134. The gender of the user and/or users may be determined via the devices based on signals from one or more sensors (e.g., camera, microphone) that indicates male or female (e.g., features of the users' faces, properties of the users' voices (depth, pitch)). In some embodiments, the gender of each user may be preconfigured and stored in memory and, when the devices determine recognize the person, the gender may be retrieved for the person's ID 170.

A fourth people/object data 136 may include audio 176 features of the objects and/or people. The audio 176 may be obtained via one or more sensors (e.g., microphone) in the sensing devices 138 and/or the client devices 134. The audio 176 obtained may provide for voice recognition and aid in recognizing particular users in the smart-device environment 30. Further, the audio 176 may be used to determine the users' ages and/or genders as discussed above. Also, the audio 176 may enable determining a user's mood based on volume of the user's voice, detected breathing rate, crying, and so forth, as well as the user's medical condition based on detected coughing, sneezing, and so forth. For objects, the audio 176 data may help determine the class of the objects (e.g., such as musical instruments, sporting goods, A fifth people/object data 136 may include visual 178 features of the objects and/or people. The visual 178 data may be obtained via one or more sensors of the sensing devices 138 and/or client devices 134 and may include the appearance of the people and/or objects detected in and around the smart-device environment 30. With regards to people, the visual 178 data may be used to recognize particular users (e.g., via facial recognition) and/or to determine other properties of the people, such as the users' ages, genders, fashion-taste, style, preferred activities, moods, occupancy schedules, and/or medical conditions, among other things. Regarding objects, the visual 178 data may be used to recognize objects and determine the object ID and/or the object class (e.g., music instrument, sporting good, electronic devices), as described below.

A sixth people/object data 136 may include an object ID 180 for the recognized objects. In some embodiments, the object ID 180 may be determined by recognizing the object in the smart-device environment 30 based upon the visual 178 and audio 176 features related to the object discussed above. For example, the visual 178 and audio 176 features may be used to perform object recognition techniques, a signature signal (RF ID) emitted by a particular object (e.g., musical instrument, sporting good, electronic device), and so forth, to determine the object ID 180 for each object in the smart-device environment 30.

A seventh people/object data 136 may include an object class 182. In some embodiments, the object class 182 may be determined by the sensing devices 138 and/or client devices 134 based on signals from one or more sensors indicative of the visual 178 and/or audio 176 features discussed above. The object class 182 may refer to any class of object that is suitable for logically grouping one or more objects together (akin to a genus including grouped species). For example, object classes 182 may include musical instruments, sporting goods/equipment, electronic devices, furniture, appliances, lighting, speakers, clothing type, vehicle type (e.g., electric, gas-powered, sports car, minivan), food type, and so forth.

An eighth people/object data 136 may include haptic data 184. The haptic data may be obtained via a haptic sensor included on the sensing devices 138 and/or the client devices 134. The haptic data 184 may provide tactile feedback that recreates the sense of touch by applying forces, vibrations, or motions to the users. In some embodiments, the haptic data 184 may be used to determine how the user interacts with the devices including the haptic sensors to provide ads more closely tailored to the user's haptic needs, such as enabling selecting an advertisement for a protective case for an electronic device (e.g., smartphone, tablet) if the haptic sensors detect rough usage with the electronic device.

A ninth people/object data 136 may include temperature 186. The temperature 186 may be obtained via a temperature sensor included in the sensing devices 138 and/or client devices 134. In some embodiments, the temperature 186 may refer to the ambient temperature within the smart home, the temperature of the user, the temperature of an object, and so forth. In an embodiment, the temperature 186 data relating to the preferred ambient temperature of the home may be used in conjunction with weather forecasts to select weather notifications to display on the client device 134 when the temperature outside is around the same temperature preferred by the user.

A tenth people/object data 136 may include textual data 188. The textual data 188 may be obtained via a sensor enabled to perform optical character recognition (OCR) to translate printed or written text into machine-encoded text. Using OCR may enable reading the words printed on any object throughout the home, such as titles of books, movies, video games, magazines, newspapers, and/or brands of food products, toiletries, clothes, cars, and so forth. As previously discussed, the textual data 188 may be used to select certain content 132, such as TV show/movie recommendations, An eleventh people/object data 136 may include location data 190. The location data 190 may be obtained via one or more sensors enabled to determine the location of an object (e.g., global position system). The location data 190 may enable determining when a user is home or away, occupancy schedule, room preference, locale of the user and/or the home, and so forth. In some embodiments, using the location of the user and/or the home, regional advertisements and other content 132, such as local movie show times, may be provided via the client device 134.

A twelfth people/object data 136 may include radio frequency (RF) ID 192. The RF ID 192 may be detected by the network interface 18 of the devices. In some embodiments, the RF ID 192 may indicate a signature of certain electronic devices that enable determining the person ID 170 and/or the object ID 180, as discussed above.

Figure 8:
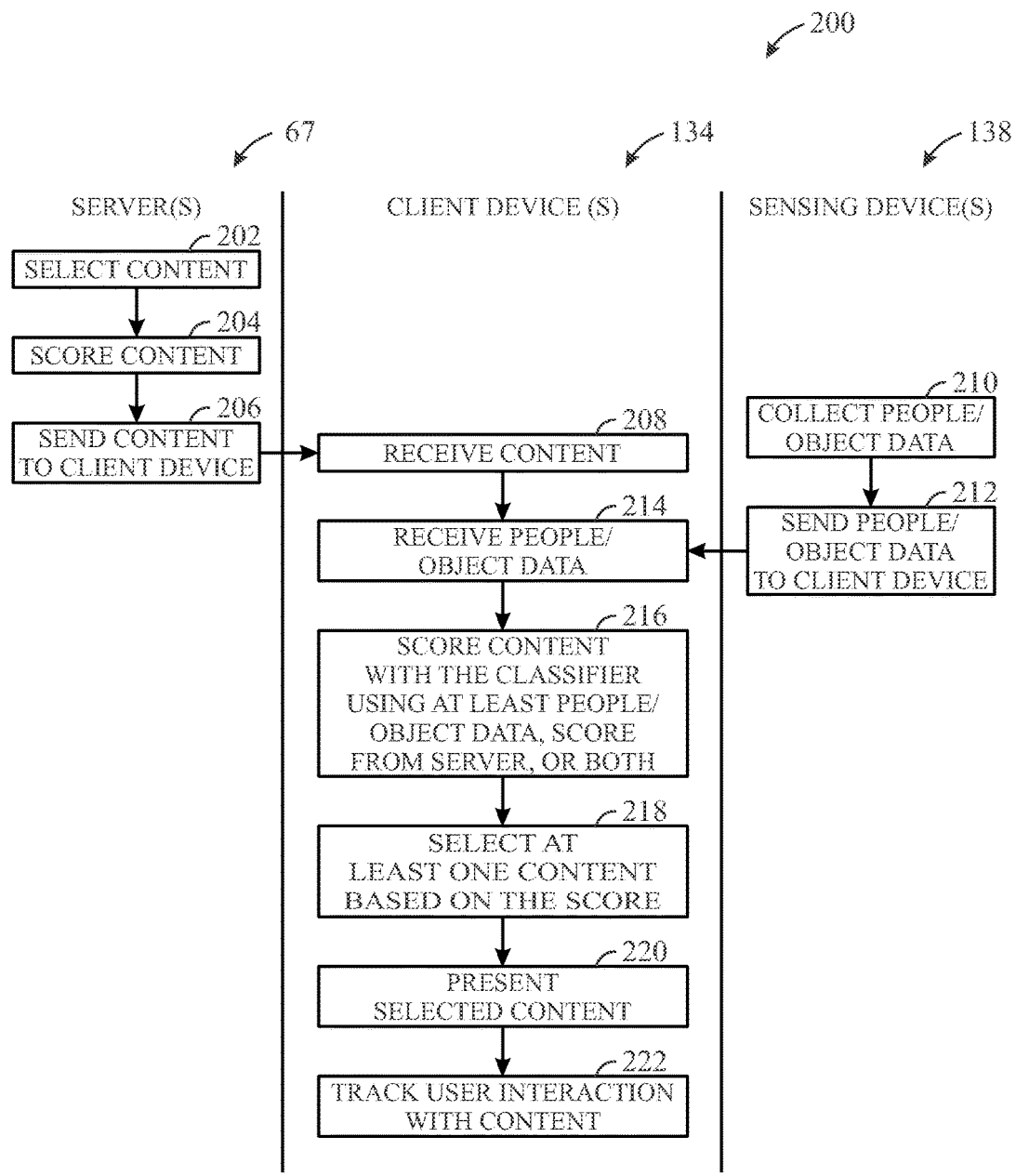
FIG. 8 is a flow diagram illustrating a process for displaying privacy-aware content on a smart-device using the system of FIG. 5, in accordance with an embodiment.

FIG. 8 is a flow diagram illustrating a process 200 for displaying privacy-aware content 132 on a smart-device using the system of FIG. 5, in accordance with an embodiment. The process may include the one or more servers 67, client devices 134, and sensing devices 138. The functionality described below may be implemented as computer instructions stored on one or more tangible, non-transitory, machine-readable medias (e.g., memories) included on each respective device (e.g., servers 67, client devices 134, sensing devices 138) performing the associated functionality.

The process 200 may include the server 67 selecting a multitude of content 132 to send to the client devices (process block 202). In some embodiments, the content 132 may be selected without having received any information related to the user's preferences from the client devices 134. As previously discussed, the content 132 may include advertisements for any suitable product or service, TV show/movie recommendations, shopping recommendations, application (e.g., Google Now) alerts, search result ranking changes (e.g., modify the search results based on the age of the user), and so forth. In some embodiments, the server 67 may initially select a set of content 132 to ensure a desirable amount of diversity between the content 132. For example, the server 67 may select 25 advertisements related to musical instruments, sporting goods, clothes, and/or other products, 25 TV show recommendations based on TV shows currently being aired, 25 movie recommendations based on movies currently being shown in major theaters, 25 Google Now alerts related to the weather, news, sports, etc., and so forth. It should be noted that the number of content 132 initially selected by the servers 67 may be quite large (e.g., thousands, hundreds of thousands, million).

In some embodiments, the server 67 may assign a score to each piece of content 132 selected in the set (process block 204). The scores may be assigned to the content 132 by the server 67 using any suitable criteria. For example, the server 67 may assign a high score to content 132 that has a relatively high rate of user conversion, that is popular in the public/news, that is trending on social media, that is receiving a large number of viewers (for TV shows), that is generating large box office sales (for movies), and so on. It should be noted that, in some embodiments, the server 67 may not score the content 132 prior to sending the content 132 to the client device 134.

In process block 206, the server 67 may send the set of content 132 to the client device 134. In embodiments where the server 67 scored the content 132, the scores may be sent with the content 132. The client device 134 may receive the content 132 from the server 67 (process block 208). In some embodiments, the set of content 132 may be retrieved via the client device 134 and indexed locally on the client device 134.

Before, during, and/or after the client device 134 receives content 132 from the server 67, the sensing device 138 may collect people/object data 136 via one or more sensors (process block 210). Then, the sensing device 138 may send the people/object data 136 to the client device 134 (process block 212), which may receive the people/object data 136 (process block 214). It should be understood that the client device 134 and sensing device 138 are communicably coupled in the private network 142 and do not send the people/object data 136 to devices external to the private network 142.

Further, although not shown in this particular way, in some embodiments, the client device 134 may collect people/object data 136 using one or more sensors, as discussed above. Also, as previously discussed, the raw people/object data 136 may be processed by the sensing device 138, the client device 134, and/or a processing device 140 depending on the implementation. The people/object data 136 may include the data described above regarding FIG. 7 that may aid in recognizing objects, people, and/or patterns, as well as determining user preferences, mood, and so forth.

After the client device 134 is in possession of the people/object data 136, the client device 134 may use the classifier 144 to score each piece of content 132. In some embodiments, the classifier 144 may combine at least the people/object data 136, the scores provided by the server 67 for the content 132, or both, to determine a final score for each piece of content 132 (process block 216), which will be discussed in more detail below.

The client device 134 may select at least one piece of content 132 to display based on the scores (process block 218). That is, the client device 134 may select the content 132 with the highest score as determined by the classifier 144 to display. However, in some embodiments, where none of the content 132 generate a score above a threshold amount, no content 132 may be selected. In those embodiments, the client device 134 may not present any content 132. However, when at least one item of content 132 scores above the threshold amount and is selected, then the client device 134 may communicate the selected content 132 to a user of the client device 134 (process block 220) and track user interaction with the content 132 (process block 222). It should be noted that when more than one item of content 132 score above the threshold amount, then the item of content 132 with the highest score may be selected. The client device 134 may use the tracked user interaction and conversions to continuously train the classifier 144 to ensure that the classifier 144 stays up to date with the latest user preferences.

It should be noted that, in some embodiments, the processing device 140 may receive the content 132 from the server 67 instead of, or in addition to, the client device 134. In embodiments where the processing device 140 receives the content 132, the processing device 140 may perform the classification of the content 132 using a classifier 144 similar to the client device 134 and the processing device 140 may select the content 132 with the highest score as determined by the classifier 144. Once selected, the processing device 140 may send the selected content 132 to the client device 134, which may communicate the selected content 132 to a user.

As should be appreciated, the people/object data 136 may only be communicated between the sensing device 138, the client device 134, and/or the processing device 140 within the private network 142. As such, the privacy of the user may be protected. The client device 134 may be the only device that uses the people/object data 136 to select content 132 that is most relevant to the user (e.g., by training the classifier 144 with the people/object data 136 and scoring content 132 higher based on the people/object data 136). In this way, the content 132 that is selected may be "privacy-aware" and may also be highly personalized to the user.

Figure 9:
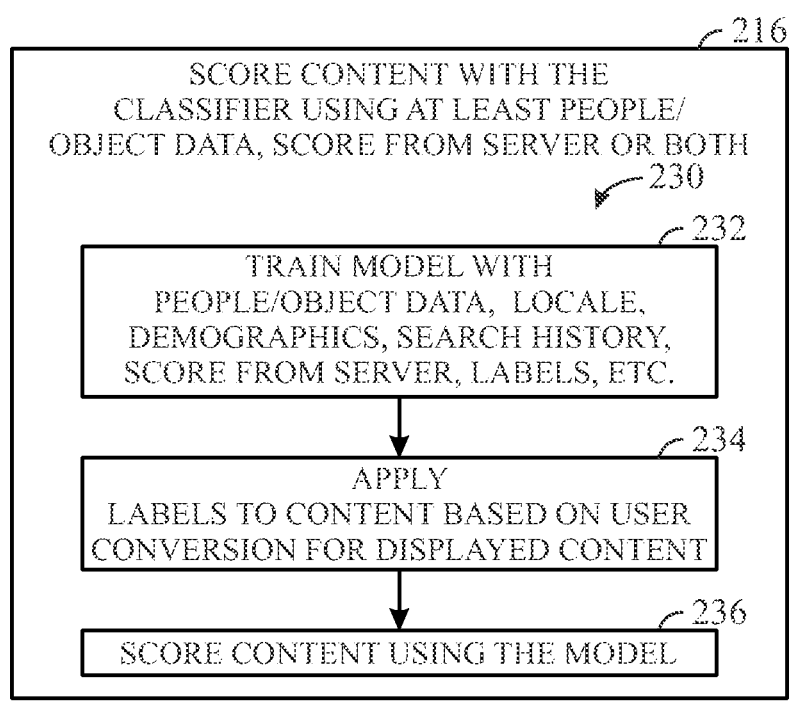
FIG. 9 is a flow diagram illustrating a process for scoring content with a classifier using at least people/object data, scores from a server, or both, in accordance with an embodiment.

FIG. 9 is a flow diagram illustrating a process 230 for scoring content 132 with a classifier 144 using at least people/object data 136, scores from a server 67, or both, in accordance with an embodiment. The process 230 may be included as part of process block 216 from FIG. 8. Further, the process 230 may be implemented as computer instructions stored on one or more tangible, non-transitory, machine-readable medias (e.g., memories) included in the client device 134.

The process 230 may include training one or more models of the classifier 144 with people/object data 136, locale 146, demographics 148, search history 150, scores from the server 67, labels 145, and so forth. As previously discussed, the classifier 144 may include a support vector machine (SVM) that uses supervised learning models to classify the content 132 into one of two groups (e.g., binary classification) based on recognized patterns using the people/object data 136, locale 146, demographics 148, search history 150, scores from the server 67, and the labels 145 for the two groups of "show" or "don't show."

The labels 145 may be applied based on the user conversion of the content 132 (process block 234), where user conversion may refer to whether the user interacts with the content or not. In some embodiments, if the user interacts with content 132, the "show" label 145 may be assigned to similar content 132. In contrast, if the user does not interact with content 132, the "don't show" label 145 may be assigned to similar content 132. Further, as previously discussed, one classifier 144 may be trained for all homes, specific to a particular home, or per device configuration. Next, the classifier 144 may score each piece of content 132 in the set of content 132 that was sent from the server 67 using the trained model (process block 236).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A smart home system operable within a local area network, the smart home system comprising:
   one or more sensor devices that capture video from an environment of the one or more sensor devices, wherein the one or more sensor devices are configured to: perform an object recognition process on the captured video to obtain object data; and
   a client device, comprising:
      a network interface configured to receive a set of content items from a content server located remotely from the smart home system and the local area network;
      a storage element for storing the set of content items; and
      a processor configured to:
         receive the object data from the one or more sensor devices via the local area network;
         train a classifier based on:
            the received object data from the one or more sensor devices, wherein the classifier is trained and operated at the client device without communicating the object data to the content server or any other computer device outside the local area network; and
            user interactions with content items on a plurality of types of smart home devices operating as part of the smart home system;
         select at least one content item from the set of content items based on the trained classifier classifying the set of content items without communicating the object data to the content server or any other computing device outside of the local area network; and
         communicate the selected at least one content item to a user of the smart home system.

2. The smart home system of claim 1, wherein the set of content items is received by the network interface from the content server sending the set of content items, the client device retrieving the set of content items from the content server and indexing the set of content items in the storage element, or some combination thereof.

3. The smart home system of claim 1, wherein the set of content items received from the content server comprises advertisements for products, services, or some combination thereof, television show listings, movie show times, shopping recommendations, software application alerts, search result rankings, or some combination thereof.

4. The smart home system of claim 1, wherein one or more models are included in a support vector machine used by the classifier that recognize patterns of the user based on the user's interaction with certain content items and the client device tracks the user's interaction with the certain content items to update the one or more models.

5. The smart home system of claim 4, wherein the classifier trains the one or more models with parameters comprising locale, demographics, search history, or some combination thereof, and the classifier is trained for all smart-device environments, for a specific smart-device environment, or for each device configuration.

6. The smart home system of claim 1, wherein the processor is configured to use the object data to determine which user is occupying a smart-device environment and selects at least one content item that is relevant to properties of the user based on the object data, the properties comprising age, gender, fashion-taste, mood, preferred activities, medical condition, or some combination thereof.

7. A method of operating a smart home system, comprising:
   obtaining, via a network interface located within a local area network, a set of content items from a content server located remotely from the smart home system and the local area network;
   capturing, using a smart camera device in communication with the local area network, video;
   performing, by the smart camera device, an optical character recognition (OCR) process on the captured video to obtain OCR data;
   transmitting, by the smart camera device, the OCR data to a client device that is in communication with the local area network;
   storing, in a storage element located within the local area network, the set of content items;
   training a classifier based on:
      the received OCR data from the smart camera device, wherein the classifier is operated at the client device without communicating the OCR data to the content server or any other computer device outside the local area network; and
      user interactions with content items on a plurality of types of smart home devices operating as part of the smart home system;
   selecting, by the client device and within the local area network, at least one content item from the set of content items based at least in part on the trained classifier classifying the set of content items without communicating the OCR data to the content server or any other computing device outside of the local area network; and
   communicating the selected at least one content item to a user of the smart home system.

8. One or more tangible, non-transitory machine-readable media of a smart home device operating as part of a smart home system comprising instructions to cause a processor to:
   obtain, via a network interface located within a local area network, a set of content items from a content server located remotely from the smart home device and the local area network;
   store, in a storage element located within the local area network, the set of content items;
   receive, from a smart camera device in communication with the local area network, video;
   perform an object recognition process to obtain first data;
   train a classifier having one or more models based on:
      the received object recognition data from the smart camera device, wherein the classifier is operated at the smart home device without communicating the object data to the content server or any other computer device outside the local area network; and user interactions with content items on a plurality of types of smart home devices operating as part of the smart home system;

select, via the processor and within the local area network, at least one content item from the set of content items based at least in part on the trained classifier classifying the set of content items without communicating the first data to the content server or any other computing device outside of the local area network; and communicating the selected at least one content item to a user of the smart home device.

9. The media of claim 8, wherein the set of content items is selected by the content server to include diverse content comprising:

advertisements for a product, service, or both, television shows schedule, movie show time recommendations, shopping recommendations, software application alerts, search result ranking changes, or some combination thereof.

10. The media of claim 8, wherein the instructions that cause the processor to train the classifier comprises:

training a binary classifier using machine learning wherein the binary classifier groups each content item of the set of content items into one of two groups including a first group of content items to communicate to the user and a second group of content items to not communicate to the user based on user conversion of the presented at least one content item.

11. The method of operating the smart home system of claim 7, wherein the client device is distinct from the smart camera device and is part of the smart home system.

12. The method of operating the smart home system of claim 7, wherein the set of content items received from the content server comprises advertisements for products, services, or some combination thereof, television show listings, movie show times, shopping recommendations, software application alerts, search result rankings, or some combination thereof.

13. The method of operating the smart home system of claim 7, wherein one or more models are included in a support vector machine used by the classifier that recognize patterns of the user based on the user's interaction with certain content items and the client device tracks the user's interaction with the certain content items to update the one or more models.

14. The method of operating the smart home system of claim 13, wherein the classifier trains the one or more models with parameters comprising locale, demographics, search history, or some combination thereof, and the classifier is trained for all smart-device environments, for a specific smart-device environment, or for each device configuration.

15. The method of operating the smart home system of claim 7, further comprising determining which user is occupying a smart-device environment and selects at least one content item that is relevant to properties of the user based on the object data, the properties comprising age, gender, fashion-taste, mood, preferred activities, medical condition, or some combination thereof.

* * * * *